(12) United States Patent  
Magallanes

(10) Patent No.: US 11,849,086 B2  
(45) Date of Patent: Dec. 19, 2023

(54) IMAGE PROCESSING APPARATUS CAPABLE OF EXTRACTING PORTION OF DOCUMENT IMAGE SPECIFIED BY PRESET INDEX AND SUBJECTING CHARACTER STRING IN EXTRACTED PORTION TO PROCESSING ASSOCIATED WITH INDEX

(71) Applicant: KYOCERA Document Solutions Inc., Osaka (JP)

(72) Inventor: Raffy Magallanes, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/880,633

(22) Filed: Aug. 3, 2022

(65) Prior Publication Data

US 2023/0045089 A1 Feb. 9, 2023

(30) Foreign Application Priority Data

Aug. 5, 2021 (JP) .................................. 2021-129243

(51) Int. Cl.
*H04N 1/00* (2006.01)

(52) U.S. Cl.
CPC ....... *H04N 1/00331* (2013.01); *H04N 1/0009* (2013.01)

(58) Field of Classification Search
None
See application file for complete search history.

(56) References Cited

U.S. PATENT DOCUMENTS

2005/0278624 A1* 12/2005 Nishikawa .............. G06T 11/60  
    715/236  
2013/0233917 A1   9/2013 Utsunomiya et al.  
2021/0286991 A1* 9/2021 Miyauchi ................ G06F 18/22

FOREIGN PATENT DOCUMENTS

JP      2009260590 A    11/2009  
JP      2013186804 A    9/2013

* cited by examiner

*Primary Examiner* — Andrew H Lam  
(74) *Attorney, Agent, or Firm* — IP BUSINESS SOLUTIONS, LLC

(57) ABSTRACT

An image processing apparatus includes an image input device and a control device. An image of an original document is input to the image input device. The control device functions as a controller. The controller identifies a preset index contained in the image of the original document input to the image input device, extracts from the image of the original document a portion of the image specified by the index, recognizes a character string in the extracted portion, and subjects the recognized character string to processing associated with the index to generate edition information.

5 Claims, 14 Drawing Sheets

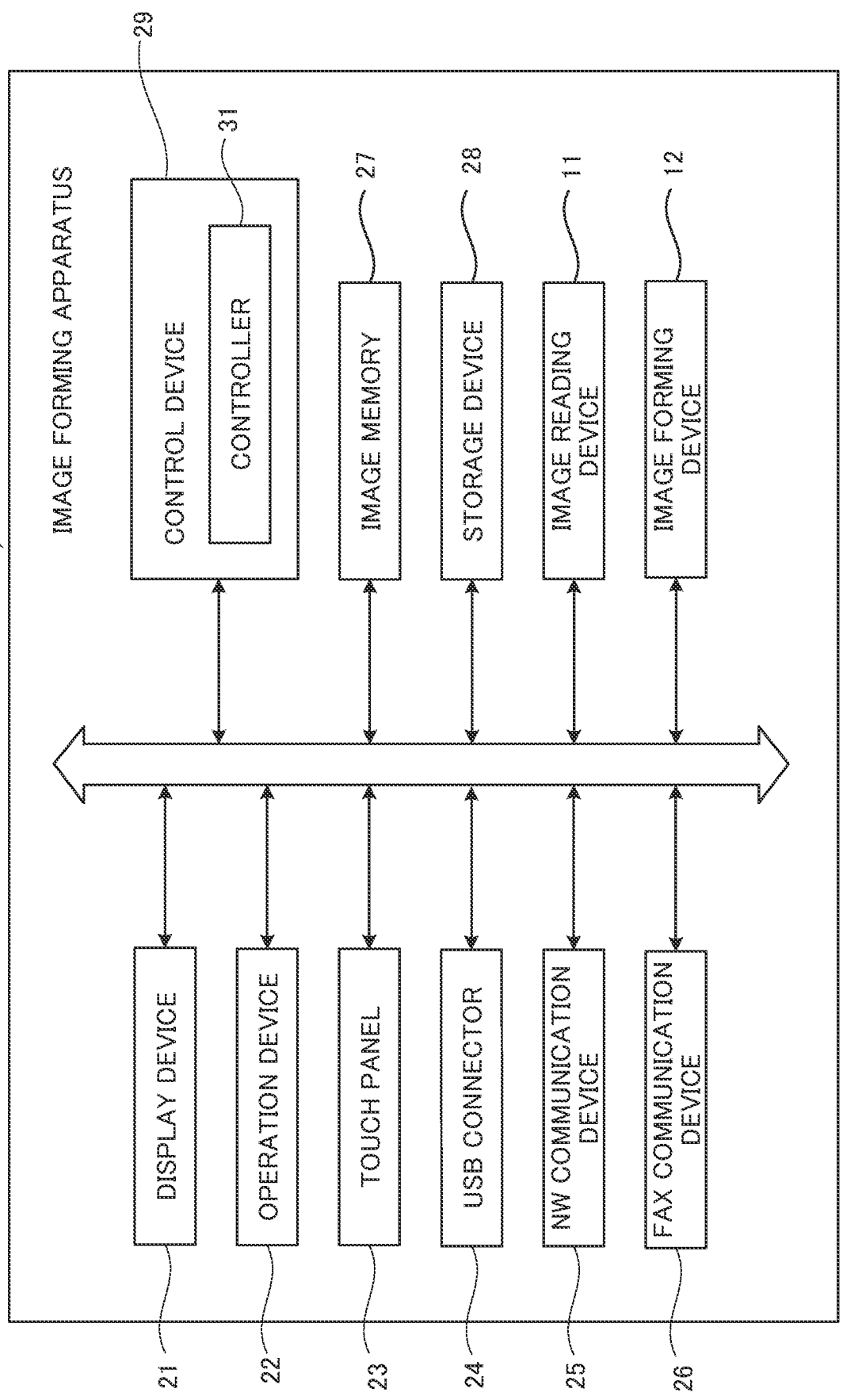

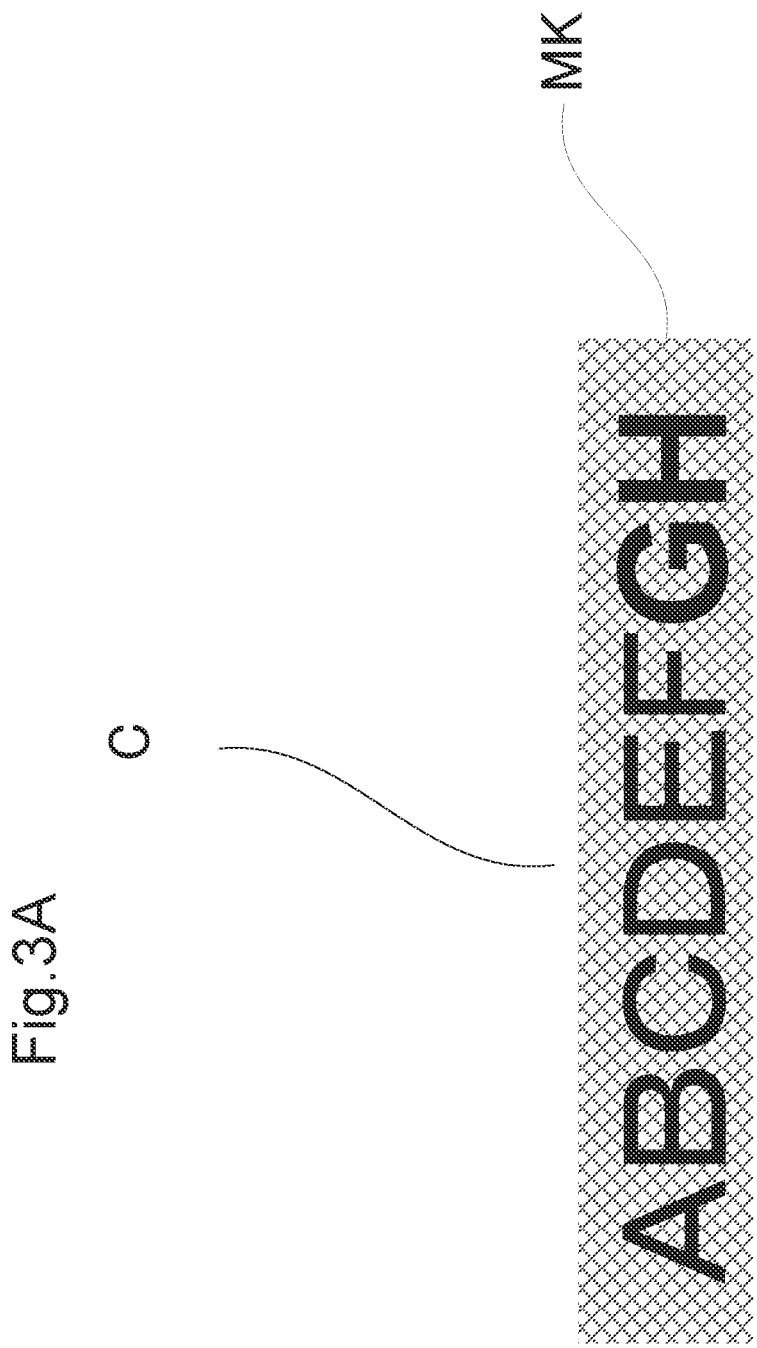

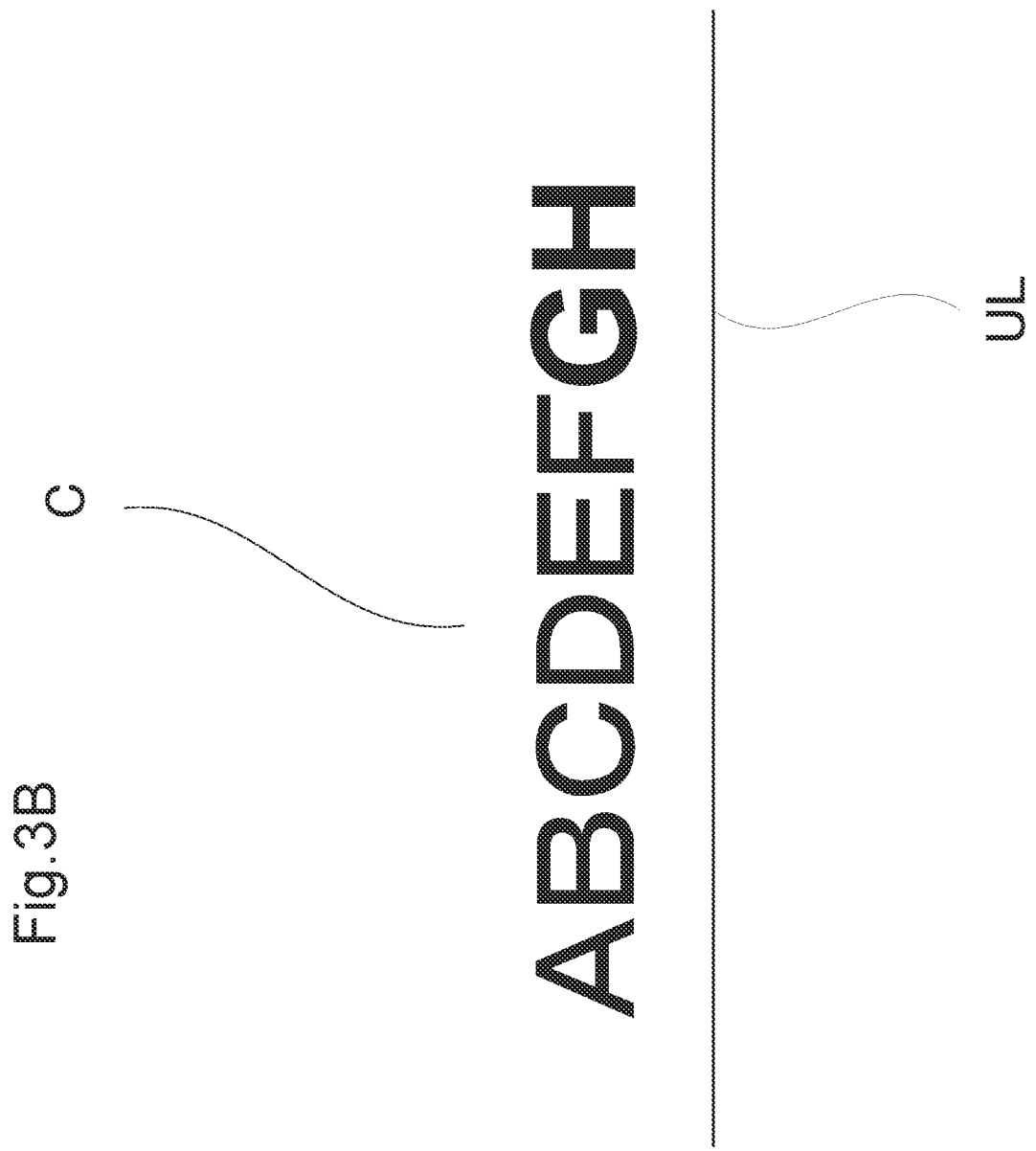

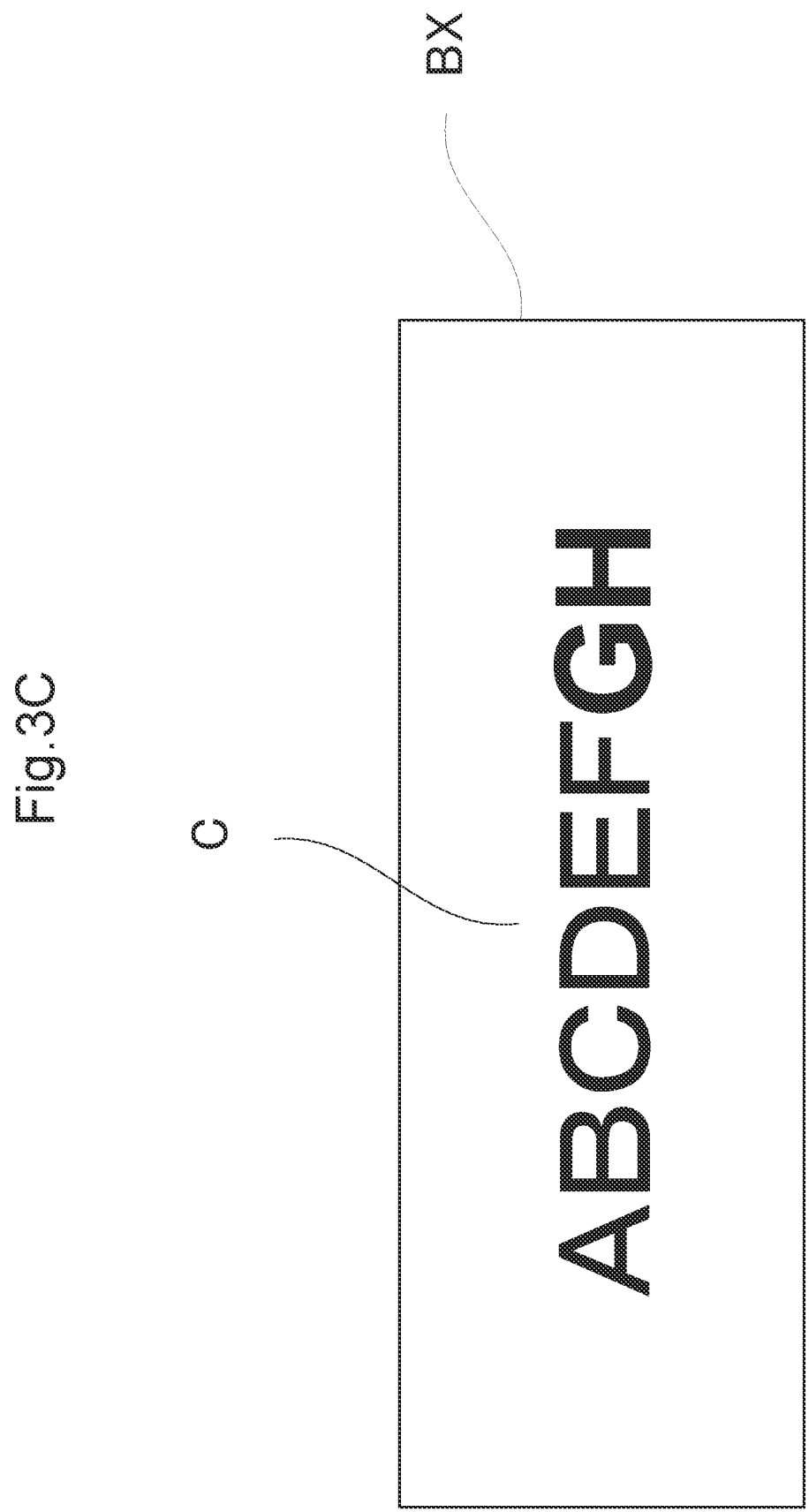

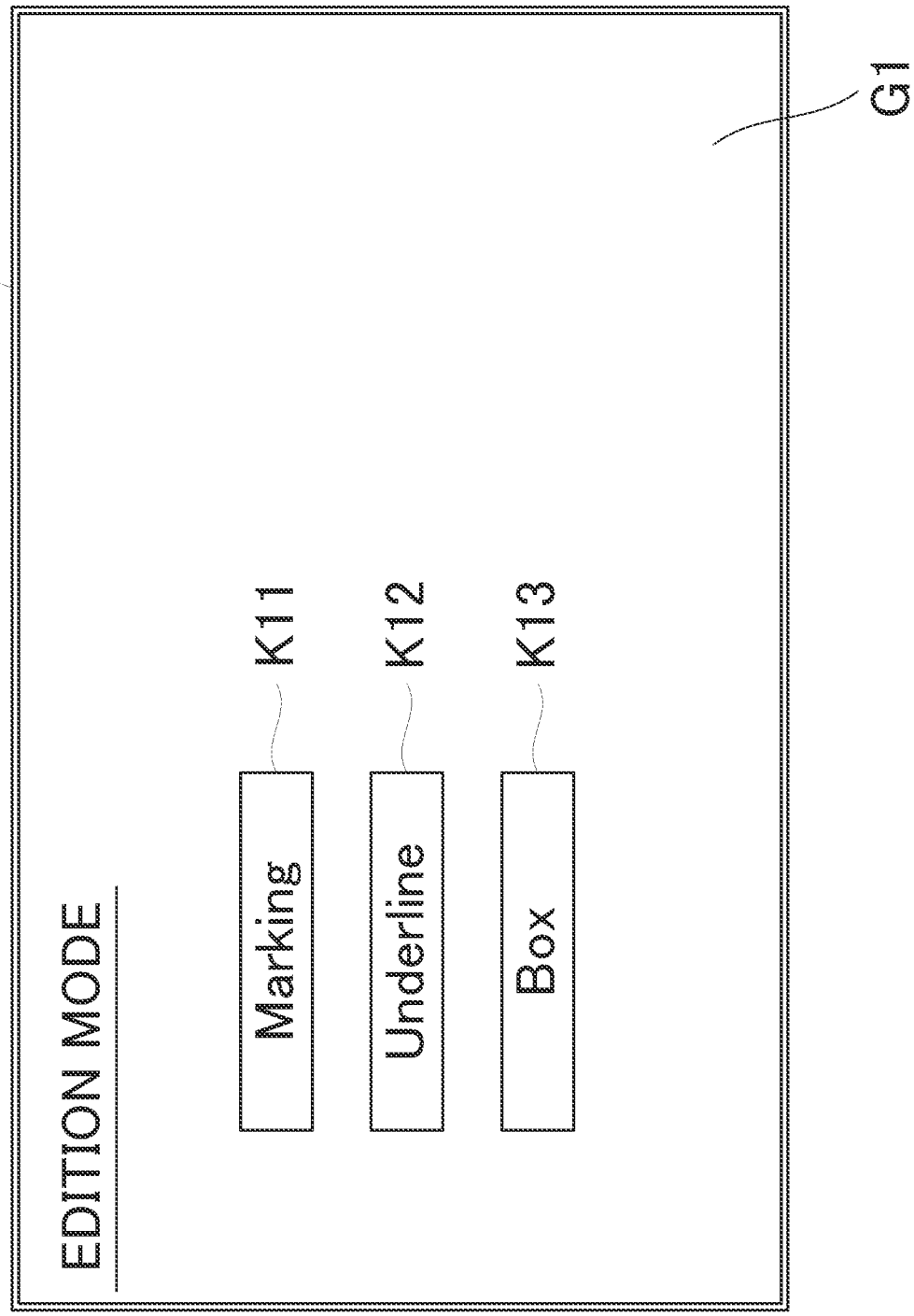

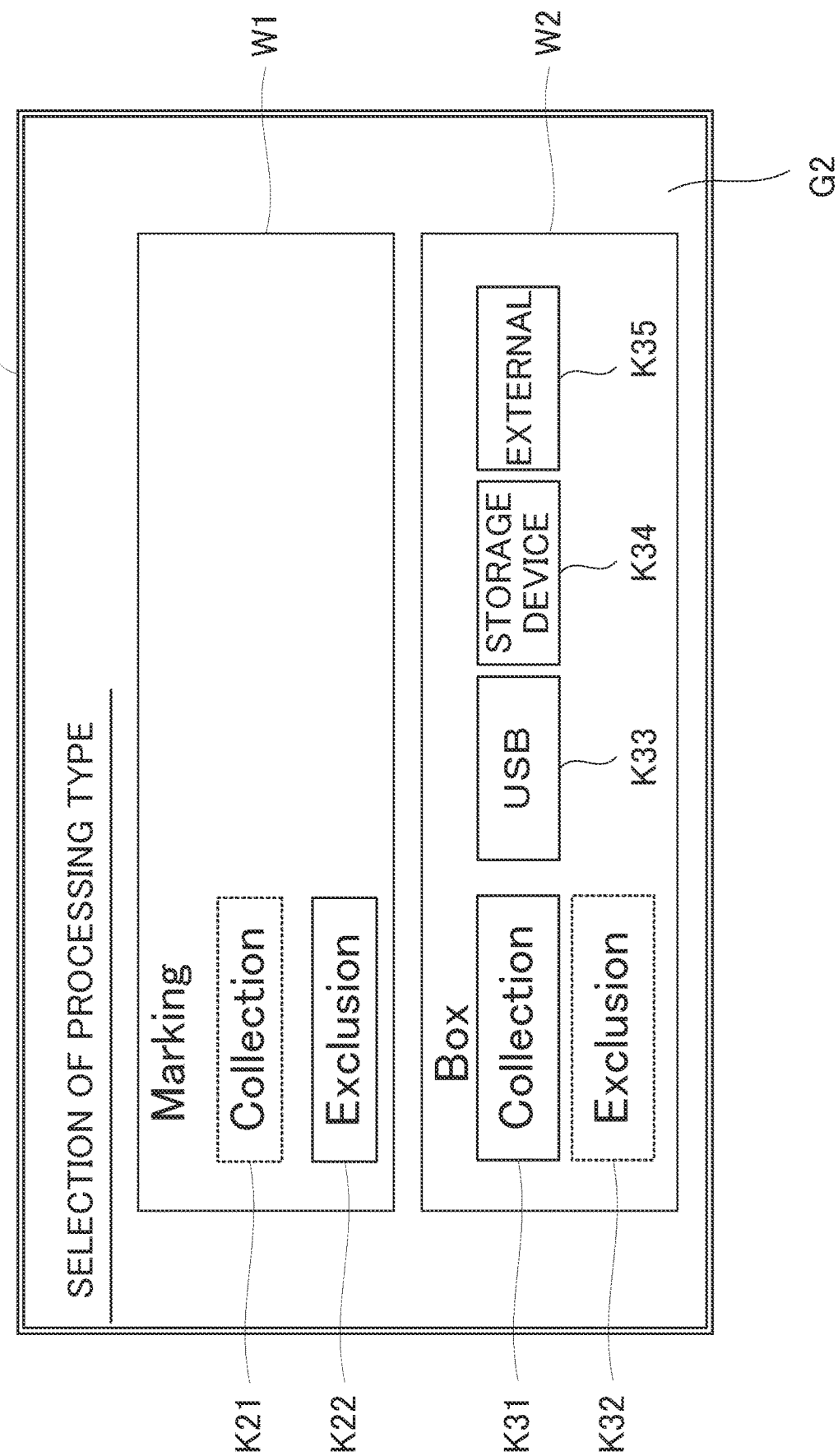

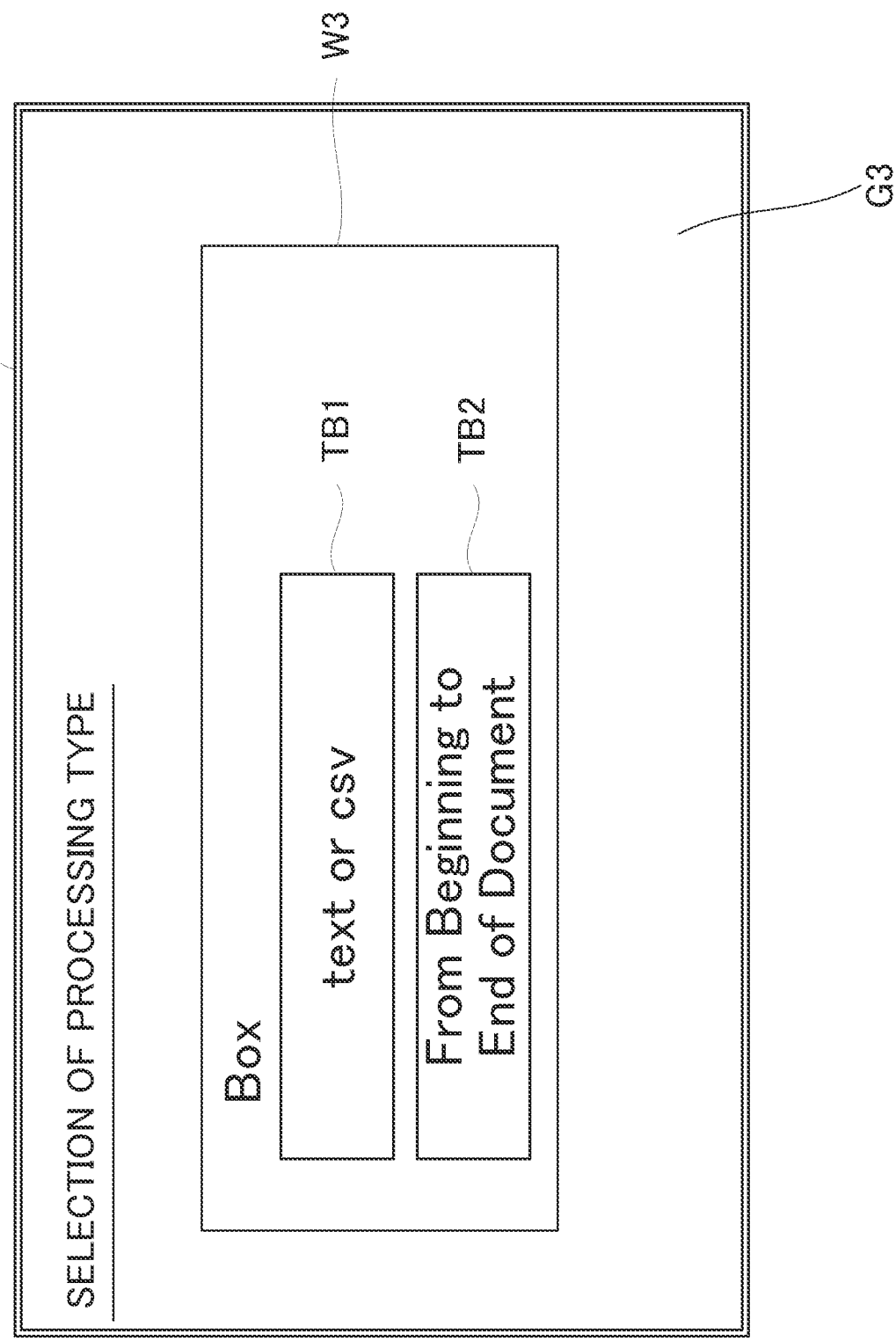

Fig.7

| INDEX | PROCESSING TYPE |
|---|---|
| Marking (color: red) | Exclusion |
| Box | Collection, USB, File Format (text or csv) |

DT

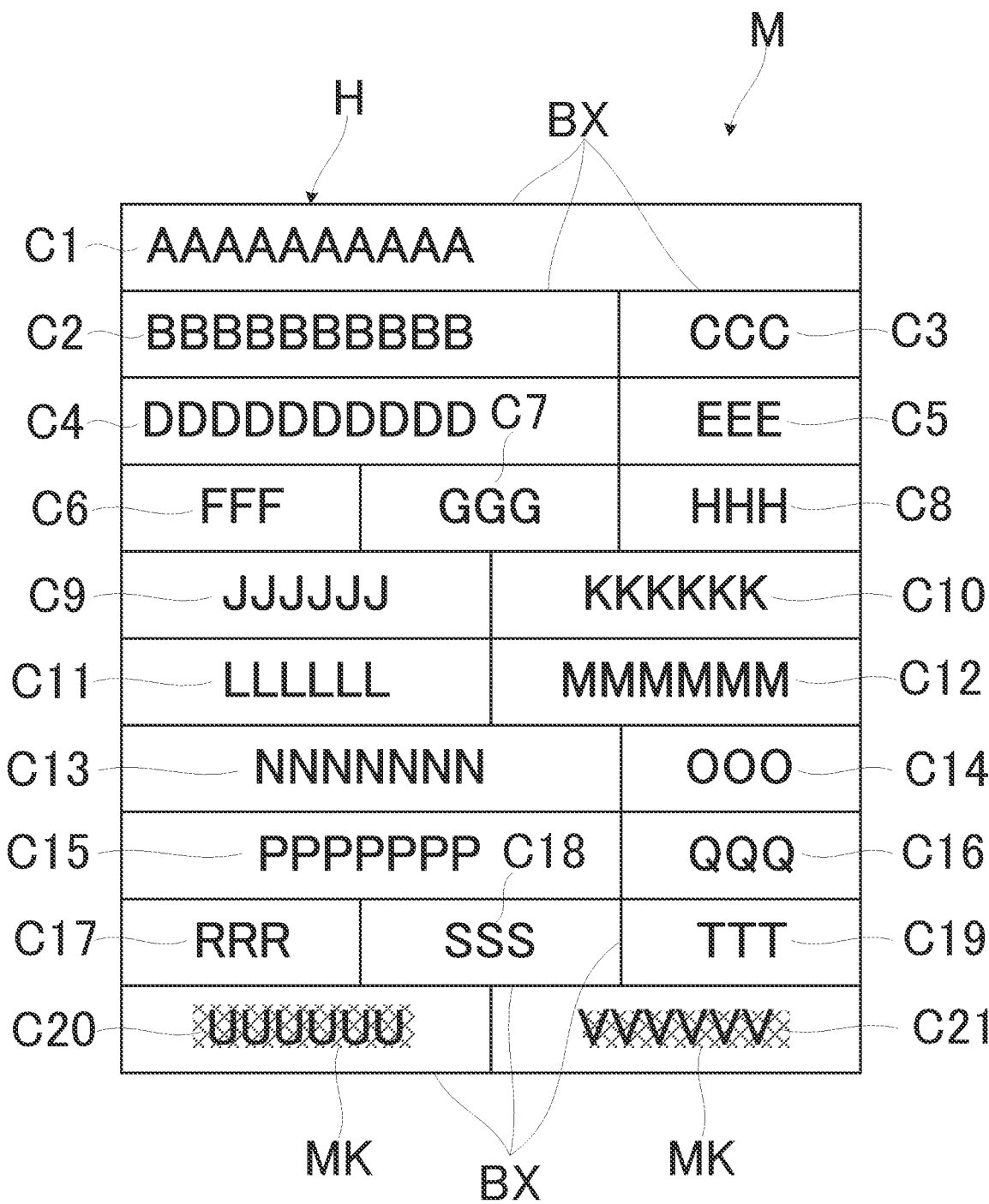

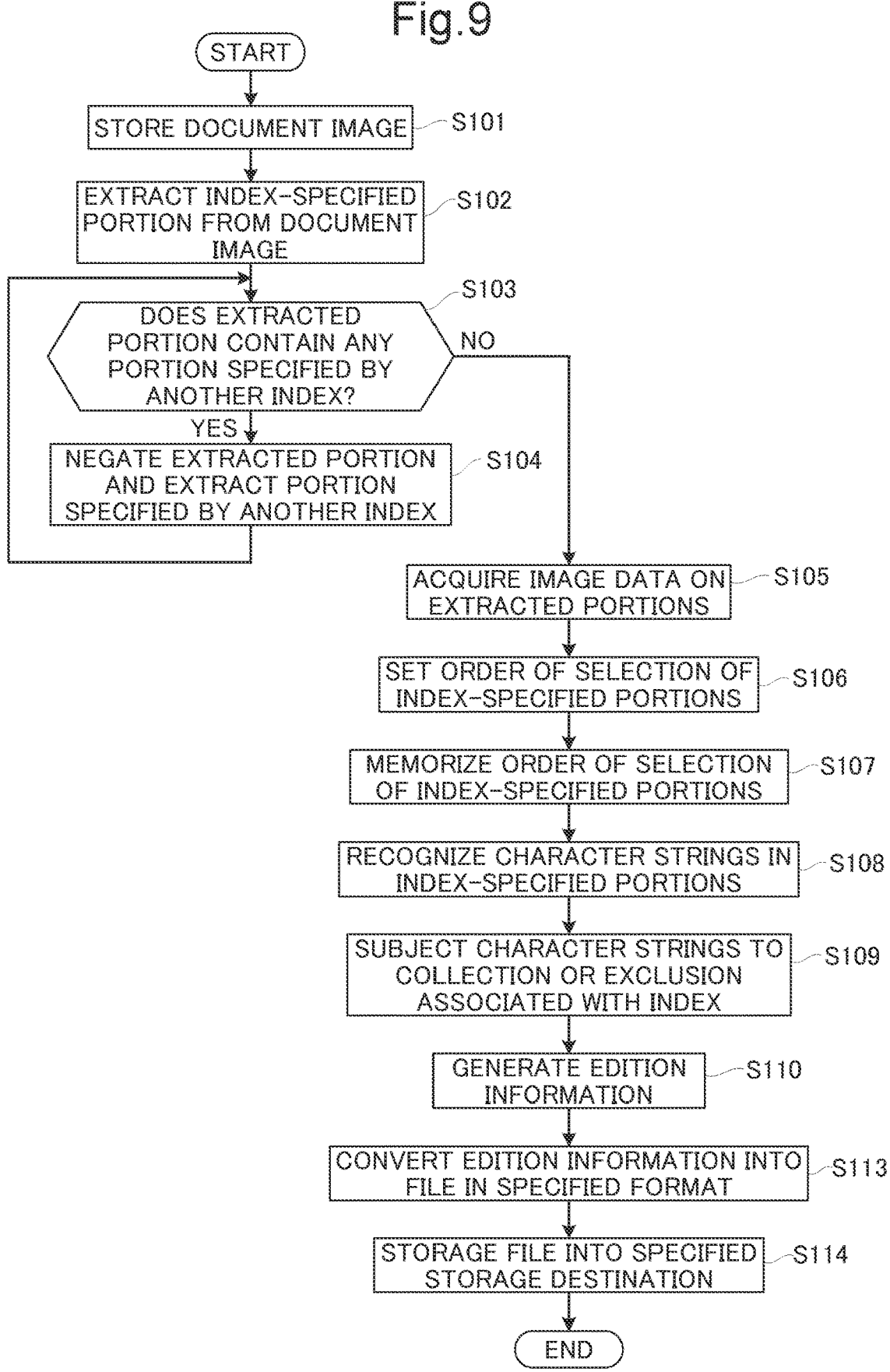

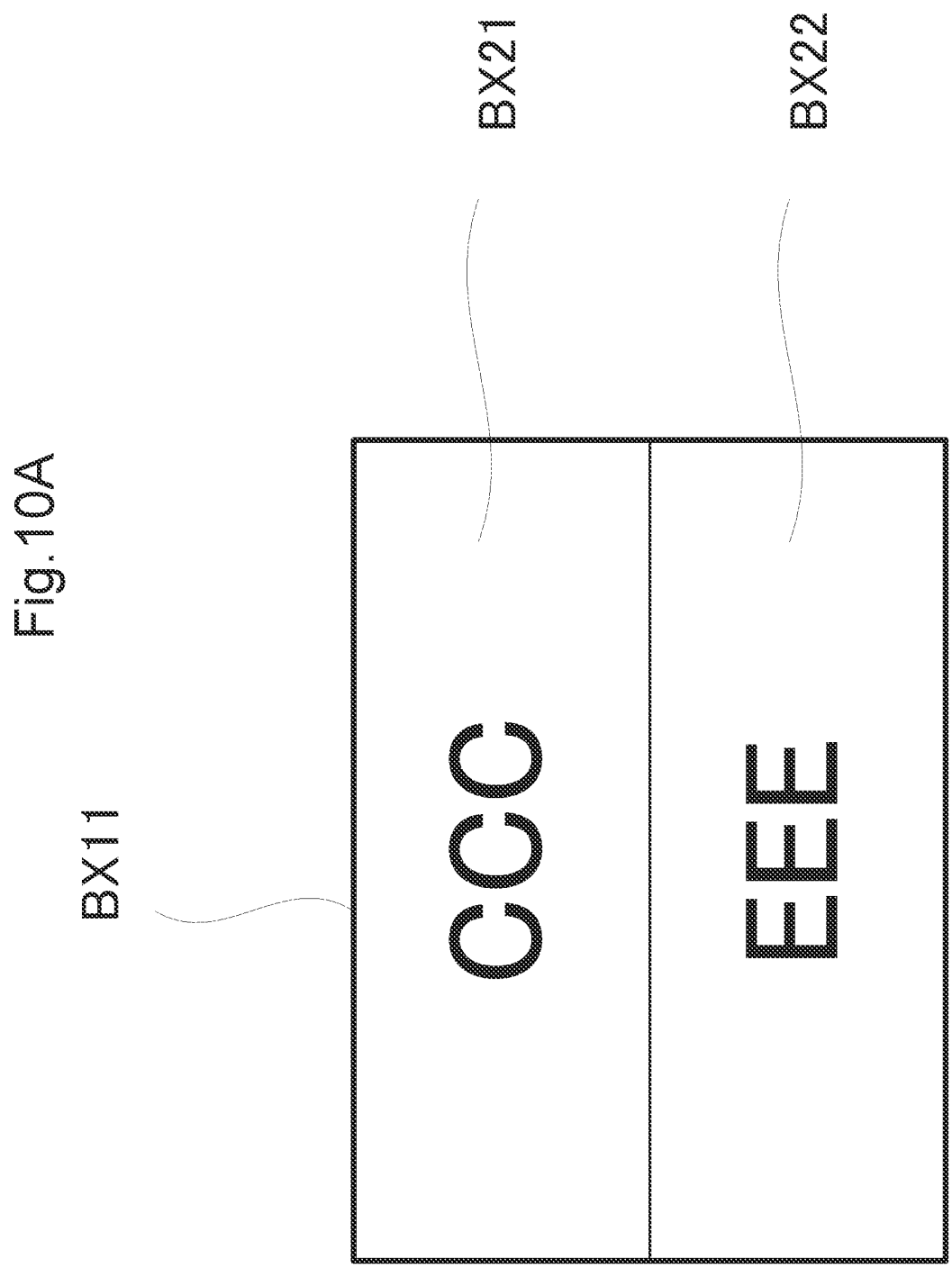

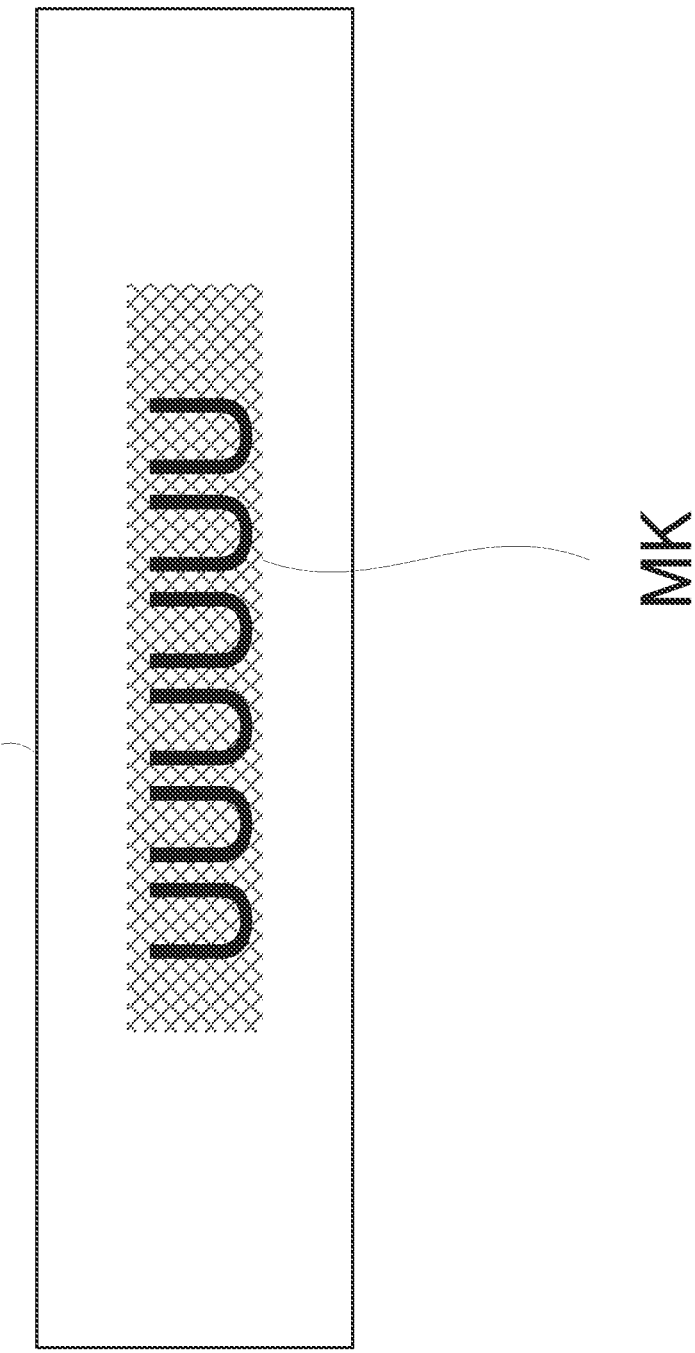

IMAGE PROCESSING APPARATUS CAPABLE OF EXTRACTING PORTION OF DOCUMENT IMAGE SPECIFIED BY PRESET INDEX AND SUBJECTING CHARACTER STRING IN EXTRACTED PORTION TO PROCESSING ASSOCIATED WITH INDEX

INCORPORATION BY REFERENCE

This application claims priority to Japanese Patent Application No. 2021-129243 filed on 5 Aug. 2021, the entire contents of which are incorporated by reference herein.

BACKGROUND

The present disclosure relates to image processing apparatuses capable of processing input document image and particularly relates to a technique for recognizing a character string in a document image and processing the character string.

There is known a multifunction peripheral (MFP) as an example of a general image processing apparatus. The MFP prints on a recording paper sheet an image of an original document input thereto by reading it with an image reading device or an image of an original document input thereto from an external device.

There is also known a general document reading device that extracts a region of a photograph in an original document specified by a marking and stores image data on the photograph into an electronic file.

Furthermore, there is known a general data storage device that receives from a server a two-dimensional code indicating a storage destination for a file, allows a mobile phone to read the two-dimensional code, allows the mobile phone to send the file and the storage destination for the file to the server, and allows the server to store the file into the storage destination.

SUMMARY

A technique improved over the aforementioned techniques is proposed as one aspect of the present disclosure.

An image processing apparatus according to an aspect of the present disclosure includes an image input device and a control device. An image of an original document is input to the image input device. The control device includes a processor and functions as a controller through the processor executing a control program. The controller identifies a preset index contained in the image of the original document input to the image input device, extracts from the image of the original document a portion of the image specified by the index, recognizes a character string in the extracted portion, and subjects the recognized character string to processing associated with the index to generate edition information.

BRIEF DESCRIPTION OF THE DRAWINGS

FIG. 2 is a functional block diagram showing an essential internal configuration of the image forming apparatus.

FIG. 3A is a view showing an example of a marking given to a character string.

FIG. 3B is a view showing an example of an underline placed under a character string.

FIG. 3C is a view showing an example of a box enclosing a character string.

FIG. 4 is a view showing an example of a setting screen for an edition mode.

FIG. 5 is a view showing an example of a first processing selection screen.

FIG. 6 is a view showing an example of a second processing selection screen.

FIG. 7 is a view conceptually showing a data table where individual indices are associated with individual types of processing.

FIG. 8 is a view showing an example of an image of an original document.

FIG. 9 is a flowchart showing the control procedure of edition processing.

FIG. 10A is a view showing a state where a first portion enclosed in a box contains two second portions each enclosed in a smaller box.

FIG. 10B is a view showing a state where a first portion enclosed in a box contains a second portion with a marking.

DETAILED DESCRIPTION

Hereinafter, a description will be given of an embodiment of the present disclosure with reference to the drawings.

Figure 1:
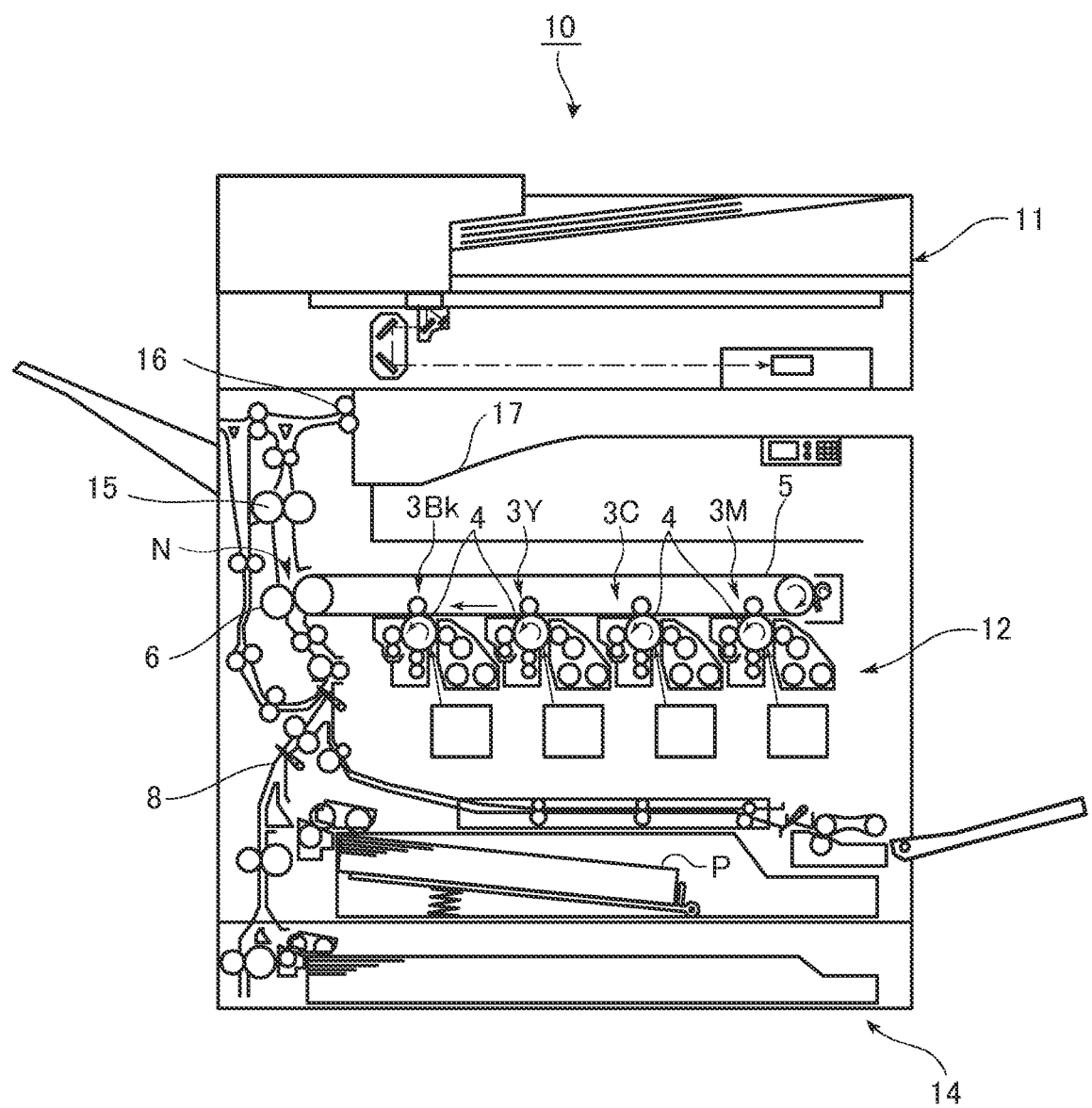
FIG. 1 is a cross-sectional view showing an image forming apparatus to which an image processing apparatus according to one embodiment of the present disclosure is applied.

FIG. 1 is a cross-sectional view showing an image forming apparatus 10 to which an image processing apparatus according to one embodiment of the present disclosure is applied. The image forming apparatus 10 is, for example, an MFP (multifunction peripheral) combining a plurality of functions, such as a copy function, a print function, and a facsimile function. The image forming apparatus 10 includes an image reading device 11 and an image forming device 12.

The image reading device 11 includes an image pickup device capable of optically reading an image of an original document. The image reading device 11 converts an analog output of the image pickup device to a digital signal to generate image data representing the image of the original document.

The image forming device 12 forms an image represented by the image data on a recording paper sheet. The image forming device 12 includes an image forming unit 3M for magenta, an image forming unit 3C for cyan, an image forming unit 3Y for yellow, and an image forming unit 3Bk for black. Each of these image forming units 3M, 3C, 3Y, and 3Bk uniformly charges the surface of a photosensitive drum 4, exposes the surface of the photosensitive drum 4 to light to form an electrostatic latent image on the surface of the photosensitive drum 4, develops the electrostatic latent image on the surface of the photosensitive drum 4 into a toner image, and primarily transfers the toner image on the surface of the photosensitive drum 4 to an intermediate transfer belt 5. Thus, a multicolor toner image is formed on the intermediate transfer belt 5. This multicolor toner image is secondarily transferred, at a nip region N between the intermediate transfer belt 5 and a secondary transfer roller 6, to a recording paper sheet P conveyed from a sheet feed device 14 via a conveyance path 8.

A fixing device 15 applies heat and pressure to the recording paper sheet P to fix the toner image on the recording paper sheet P by heat and pressure. The recording paper sheet P is discharged through an ejection roller 16 to a sheet output tray 17.

Next, a description will be given of the configuration relating to the control of the image forming apparatus 10. FIG. 2 is a functional block diagram showing an essential internal configuration of the image forming apparatus 10. As shown in FIG. 2, the image forming apparatus 10 includes the image reading device 11, the image forming device 12, a display device 21, an operation device 22, a touch panel 23, a USB connector 24, a network communication device 25, a facsimile communication device 26, an image memory 27, a storage device 28, and a control device 29. These components are capable of data or signal transfer via a bus among them.

The display device 21 is formed of a liquid crystal display (LCD), an organic EL (organic light-emitting diode (OLED)) display or the like. The operation device 22 includes physical keys, including numeric keys, an Enter key, and a Start key. The operation device 22 accepts various instructions based on user's operations. The operation device 22 functions as an operation device defined in CLAIMS.

The touch panel 23 is disposed over the screen of the display device 21. The touch panel 23 is a touch panel of a resistive film system, a capacitance system or any other system. The touch panel 23 detects a touch on the touch panel 23 with a user's finger or the like, together with a point of the touch, and outputs a detection signal indicating the coordinate of the point of touch to a later-described controller 31 of the control device 29 and so on. The touch panel 23 also functions as an operation device defined in CLAIMS.

The USB connector 24 is a connecting terminal based on the USB standard. The USB connector 24 is connected to a USB memory or connected to a terminal device through a USB cable.

The network communication device (NW communication device) 25 is a communication interface including a communication module, such as a LAN (local area network) chip. The NW communication device 25 is connected through a wired or wireless LAN to other terminal devices and sends and receives data to and from the terminal devices through the LAN.

The facsimile communication device (FAX communication device) 26 is, for example, a modem PCI (peripheral component interconnect) board having a facsimile function. The FAX communication device 26 sends and receives image data representing an image to and from other image forming apparatuses, facsimile devices, and others through a network.

The image memory 27 stores image data representing an image of an original document read by the image reading device 11, image data representing an image sent from an external terminal device and received by the network communication device 25, or other image data.

The storage device 28 is a large storage device, such as an SSD (solid state drive) or an HDD (hard disk drive). The storage device 28 holds various types of application programs and various types of data.

The control device 29 is made up of a processor, a RAM (random access memory), a ROM (read only memory), and so on. The processor is, for example, a CPU (central processing unit), an ASIC (application specific integrated circuit) or an MPU (micro processing unit). When a control program stored in the ROM or the storage device 28 is executed by the above processor, the control device 29 functions as a controller 31.

The controller 31 provides overall control of the image forming apparatus 10. The control device 29 is connected to the image reading device 11, the image forming device 12, the display device 21, the operation device 22, the touch panel 23, the USB connector 24, the network communication device 25, the facsimile communication device 26, the image memory 27, the storage device 28, and so on. The controller 31 performs operation control on each of the above components and signal or data transfer to and from each of the components.

The controller 31 serves as a processor that executes various types of processing necessary for image formation by the image forming apparatus 10.

The controller 31 accepts an instruction input by a user, based on a detection signal output from the touch panel 23 or operation on a physical key of the operation device 22. For example, the controller 31 accepts through the touch panel 23 an instruction based on a touch gesture on a GUI (graphical user interface) or the like being displayed on the screen of the display device 21.

The controller 31 has the function of controlling the display operation of the display device 21 and the function of controlling the communication operations of the network communication device 25 and the facsimile communication device 26.

When in the image forming apparatus 10 having the above structure, for example, the user places an original document in the image reading device 11 and operates a Start key of the operation device 22, the controller 31 accepts through the operation device 22 an image formation instruction to form an image. In accordance with the image formation instruction, the controller 31 allows the image reading device 11 to read the image of the original document and allows the image memory 27 to temporarily store image data representing the image of the original document. Subsequently, the controller 31 inputs the image data to the image forming device 12 and allows the image forming device 12 to form the image of the original document on a recording paper sheet.

Alternatively, when the network communication device 25 receives image data representing the image of an original document sent from an external terminal device, the controller 31 allows the image memory 27 to temporarily store the received image data. Subsequently, the controller 31 inputs the image data to the image forming device 12 and allows the image forming device 12 to form the image of the original document on a recording paper sheet.

The controller 31 has an edition mode for allowing the components of the image forming apparatus 10 to perform the operation of recognizing a character string contained in the image of an original document and editing the character string. When the edition mode is selected, the controller 31 identifies, based on image data stored in the image memory 27, a preset index contained in the image of the original document, extracts a portion of the original document specified by the index, recognizes a character string in the extracted document portion, and subjects the recognized character string to processing associated with the index to generate edition information from the image of the original document.

Examples of the index include a marking MK given to a character string C in the image of an original document M as shown in FIG. 3A, an underline UL placed under a character string C in the image of an original document M as shown in FIG. 3B, and a box BX enclosing a character string C in the image of an original document M as shown in FIG. 3C.

Examples of the types of processing associated with the index include the collection of a character string C, the exclusion of a character string C, and the storage of edition information generated by the collection and exclusion of the character string C.

When, under the circumstances, an instruction to display a setting screen for the edition mode is input to the touch panel 23 based on a user's operation on a GUI (graphical user interface) or the like being displayed on the screen of the display device 21, the controller 31 allows the display device 21 to display the setting screen for the edition mode in accordance with the instruction.

For example, the controller 31 allows the display device 21 to display a setting screen G1 for the edition mode as shown in FIG. 4. Specifically, the controller 31 allows the display device 21 to display on the setting screen G1 a Marking key K11 representing the marking MK, an Underline key K12 representing the underline UL, and a Box key K13 representing the box BX.

The user selects, on the setting screen G1 for the edition mode, at least one of the marking MK, the underline UL, and the box BX as a target to be set.

For example, when the user touches the Marking key K11 and the Box key K13, the controller 31 accepts through the touch panel 23 an instruction to select as indices for use by the user the marking MK represented by the Marking key K11 and the box BX represented by the Box key K13. In accordance with the accepted instruction, the controller 31 allows the display device 21 to display a first processing selection screen through which selections of respective types of processing to be associated with the selected marking MK and box BX are accepted.

For example, the controller 31 allows the display device 21 to display a first processing selection screen G2 through which the selected indices are to be associated with respective arbitrary types of processing as shown in FIG. 5. Specifically, the controller 31 allows the display device 21 to display on the first processing selection screen G2 a window W1 for use in selecting a type of processing to be associated with the selected marking MK and a window W2 for use in selecting a type of processing to be associated with the selected box BX.

The controller 31 allows the display device 21 to display within the window W1 a Collection key K21 for selecting the processing of collection of any character string C with a marking MK and an Exclusion key K22 for selecting the processing of exclusion of any character string C with a marking MK. With a user's touch gesture on the Collection key K21, the controller 31 accepts through the touch panel 23 an instruction to collect any character string C with a marking MK. Alternatively, with a user's touch gesture on the Exclusion key K22, the controller 31 accepts through the touch panel 23 an instruction to exclude any character string C with a marking MK. FIG. 5 shows a state where the window W1 is displayed when the processing of exclusion of any character string C with a marking MK has been selected by a touch gesture on the Exclusion key K22. When accepting the selection of the processing of collection of any character string C with a marking MK based on a touch gesture on the Collection key K21, the controller 31 allows the display device 21 to display on the first processing selection screen G2 keys for selecting any one of the USB, the storage device, and so on as the storage destination for edition information indicating the collected character strings C.

The controller 31 allows the display device 21 to display within the window W2 a Collection key K31 for selecting the processing of collection of any character string C enclosed in a box BX and an Exclusion key K32 for selecting the processing of exclusion of any character string C enclosed in a box BX. With a user's touch gesture on the Collection key K31, the controller 31 accepts through the touch panel 23 an instruction to collect any character string C enclosed in a box BX. Alternatively, with a user's touch gesture on the Exclusion key K32, the controller 31 accepts through the touch panel 23 an instruction to exclude any character string C enclosed in a box BX. FIG. 5 shows a state where the window W2 is displayed when the processing of collection of any character string C enclosed in a box BX has been selected by a touch gesture on the Collection key K31. In this case, since the controller 31 has accepted the selection of the processing of collection of any character string C enclosed in a box BX based on a touch gesture on the Collection key K31, it allows the display device 21 to display within the window W2 keys K33, K34, and K35 for selecting any one of the USB, the storage device 28, and an external storage, respectively, as the storage destination for edition information indicating the collected character strings C.

The key K33 is a key for use in inputting an instruction to specify as the storage destination a USB memory connected to the USB connector 24. The key K34 is a key for use in inputting an instruction to specify the storage device 28 as the storage destination. The key K35 is a key for use in inputting an instruction to specify as the storage destination an external storage connected through the network communication device 25 to the image forming apparatus 10. In accordance with an instruction input based on a touch gesture on any one of the keys K33, K34, and K35, the controller 31 allows the edition information to be stored in one of the USB memory, the storage device 28, and the external storage.

Furthermore, upon acceptance of the instruction for specifying the storage destination for the edition information based on the touch gesture on one of the keys K33, K34, and K35, the controller 31 allows the display device 21 to display a second processing selection screen G3 as shown in FIG. 6. Specifically, the controller 31 allows the display device 21 to display a window W3 on the second processing selection screen G3. The controller 31 allows the display device 21 to display within the window W3 a text box TB1 for selecting the file format of the edition information and a text box TB2 showing a processing range of the document image which is a region in the document image to be processed.

When a text format or a CSV format is input as the file format for the edition information by a user's operation on the operation device 22, the controller 31 registers into a data table DT of the storage device 28 the input file format in association with the index and allows the display device 21 to display the input file format within the text box TB1. Furthermore, when a processing range of a document image is input by a user's operation on the operation device 22, the controller 31 registers into the data table DT of the storage device 28 the input processing range in association with the index and allows the display device 21 to display the input processing range within the text box TB2.

In this manner, when the controller 31 accepts, based on user's operations on the setting screen G1, the first processing selection screen G2, and the second processing selection screen G3, the selection of an index given to an image of an original document M and the selection of a type of processing to be associated with the selected index, the controller 31 creates a data table showing the selected index and the type of processing associated with the selected index and allows the storage device 28 to store the created data table. For example, the controller 31 creates a data table DT shown in FIG. 7 and allows the storage device 28 to store the data table DT. FIG. 7 shows an example of a data table DT in which the marking MK and the box BX are registered as indices, exclusion is registered as a type of processing associated with the marking MK, and collection, a USB serving as the storage destination, and a file format (text or csv) are registered as types of processing associated with the box BX. The controller 31 registers the marking MK together with its identifying color.

When, in a situation that a data table DT is created and stored in the storage device 28, the controller 31 allows the image reading device 11 to read an image of an original document and allows the image memory 27 to store image data representing the image of the original document or the controller 31 allows the image memory 27 to store image data representing an image of an original document sent from an external terminal device and received by the network communication device 25, the controller 31 identifies, based on the image data stored in the image memory 27, any index contained in the image of the original document with reference to the indices in the data table DT, extracts from the image of the original document a portion or portions of the image specified by each index, recognizes respective character strings in the extracted portions, subjects the recognized character strings to the type of processing stored in the data table DT and associated with the index to generate edition information, and allows the preset storage destination to store the edition information.

Next, using as an example an original document M shown in FIG. 8, a description will be given of edition processing for generating, based on image data representing the image of the original document M, edition information from the image of the original document and storing the edition information in the above manner, with reference to the flowchart shown in FIG. 9.

The image of the original document M includes a table H consisting of a plurality of vertical ruled lines and a plurality of horizontal ruled lines. The table H includes a plurality of boxes BX arranged in rows and columns. The boxes BX are filled in with respective character strings C1 to C21. The character strings C20 and C21 are each given a marking MK.

The controller 31 allows the image reading device 11 to read the image of an original document M and allows the image memory 27 to store image data representing the image of the original document M. Alternatively, when the network communication device 25 receives image data representing an image of an original document M, the controller 31 allows the image memory 27 to store the image data (step S101).

The controller 31 reads from the data table DT stored in the storage device 28 a registered index or indices, i.e., the marking MK and the box BX in this example. Furthermore, the controller 31 identifies, based on the image data representing the image of the original document M, markings MK and boxes BX contained in the image of the original document M and extracts, from the image data, portions (hereinafter, referred to as "first portions") of the image specified by the identified markings MK and boxes BX (step S102). Specifically, the controller 31 identifies, as a marking MK, a portion of the image having the same color as the registered marking MK and extracts the identified portion as a first portion. Furthermore, the controller 31 identifies, as a box BX, a portion of the image of the original document M defined and enclosed by a pair of vertical lines and a pair of horizontal lines and extracts the portion determined to be a box BX as a first portion.

The controller 31 determines, for each of the first portions extracted in step S102, whether or not the first portion contains any portion (hereinafter, referred to as a "second portion") specified by any other index (step S103).

When determining that the first portion contains no second portion specified by another index ("No" in step S103), the controller 31 acquires image data on the first portion extracted in step S102 (step S105).

When determining that the first portion contains any second portion specified by any other index ("Yes" in step S103), the controller 31 negates the first portion extracted in step S102, validates and extracts, instead of the negated first portion, the second portion specified by another index (step S104), and goes back to the processing in step S103. The controller 31 determines whether or not the second portion specified by the other index contains any portion (hereinafter, referred to as a "third portion") specified by still any other index (step S103). When determining that the second portion contains no third portion specified by still another index ("No" in step S103), the controller 31 acquires image data on the second portion validated in step S104 and specified by the other index (step S105). When determining that the second portion contains any third portion specified by still any other index ("Yes" in step S103), the controller 31 repeats the processing in step S104 and the processing in step S103. In other words, the controller 31 validates, instead of the previously extracted portion, a newly extracted portion.

For example, when extracting a first portion enclosed in a box BX (step S102), the controller 31 determines whether or not the first portion contains any second portion specified by any other index, for example, enclosed in any other smaller box BX (step S103). When determining that the first portion contains no second portion enclosed in another smaller box BX ("No" in step S103), the controller 31 acquires image data on the first portion extracted in step S102 and enclosed in the box BX (step S105).

When determining that the first portion extracted in step S102 contains any second portion enclosed in any other smaller box BX ("Yes" in step S103), the controller 31 extracts the second portion or portions each enclosed in another smaller box BX (step S104). The controller 31 determines whether or not the extracted second portion contains any third portion specified by still any other index, for example, enclosed in still any other smaller box BX (step S103). When determining that the second portion contains no third portion enclosed in still another smaller box BX ("No" in step S103), the controller 31 acquires image data on the second portion enclosed in another smaller box BX (step S105).

In an example shown in FIG. 10A, the controller 31 determines that a first portion enclosed in a box BX11 shown by the solid line contains two second portions enclosed in respective smaller boxes BX21 and BX22 ("Yes" in step S103) and extracts the second portions enclosed in the respective boxes BX21 and BX22 (step S104). The controller 31 determines that each of the second portions enclosed in the respective boxes BX21 and BX22 contains no third portion enclosed in a further smaller box BX ("No" in step S103) and acquires image data on each of the second portions extracted in step S104 and enclosed in the respective boxes BX21 and BX22 (step S105).

In an example shown in FIG. 10B, the controller 31 determines that a first portion enclosed in a box BX31 contains a second portion with a marking MK ("Yes" in step S103). The controller 31 extracts the second portion with a marking MK (step S104), determines that the second portion with a marking MK contains neither third portion enclosed in a further smaller box BX nor third portion with a marking MK ("No" in step S103), and acquires image data on the second portion with a marking MK extracted in step S104 (step S105).

In the manner as thus far described, the controller 31 acquires image data on each of the portions of the image of the original document M each enclosed in a box BX and the portions with a marking MK (step S105).

In acquiring image data on each of the portions (index-specified portions) of the image of the original document M specified by respective indices in step S105, the controller 31 first determines the locations of the index-specified portions in two directions along the rows and columns and then sets, based on the locations of the index-specified portions in the two directions, the order of selection of the index-specified portions (step S106). For example, based on the locations of the index-specified portions in the two directions along the rows and columns, the controller 31 sets the order of selection of the index-specified portions, first from the left end toward the right end in the first row, then from the left end toward the right end in the second row, and afterwards likewise from the left end toward the right end in the next row.

The controller 31 memorizes the order of selection of the index-specified portions of the image of the original document M set in step S106 (step S107). Based on the image data representing the image of the original document M stored in the image memory 27, the controller 31 analyzes each of the extracted index-specified portions using a known OCR (optical character recognition) function to recognize a character string C in the portion (step S108). For each of the extracted index-specified portions, the controller 31 acquires from the data table DT stored in the storage device 28 the type of processing (i.e., the processing of collection or exclusion) associated with the index and subjects the recognized character string C to the processing of collection or exclusion (step S109). The controller 31 arranges, in the order stored in step S107, the character strings C in the index-specified portions subjected to the processing of collection or exclusion, thus generating edition information (step S110).

For each of the index-specified portions, the controller 31 reads and acquires the file format and storage destination specified by the user from the data table DT stored in the storage device 28. The controller 31 converts the generated edition information into a file in the acquired file format (text format or CSV format) (step S113). Furthermore, the controller 31 allows the read storage destination (the USB memory, the storage device 28 or the external storage) to store the file in the acquired file format representing the edition information (step S114). After the processing in step S114, the controller 31 ends the edition processing.

Figure 11:
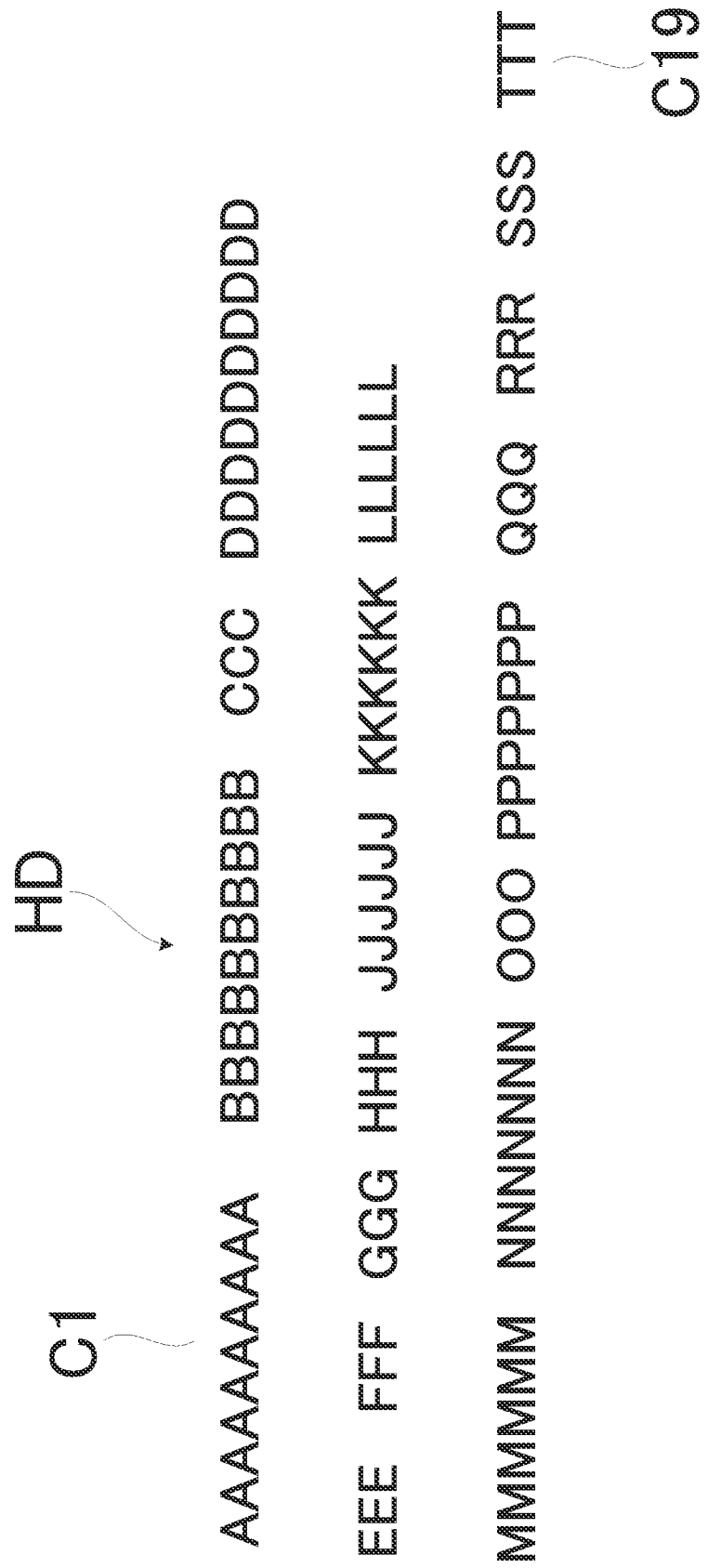
FIG. 11 is a view showing an example of edition information.

For example, in the case where the image of the original document M shown in FIG. 8 has been input, the controller 31 sequentially selects the portions of the image of the original document M each enclosed in a box BX, recognizes the character strings C1 to C19 in the portions each enclosed in a box BX, subjects the character strings C1 to C19 in the portions each enclosed in a box BX to the processing of collection, and sequentially adds the character strings C1 to C19 to edition information. Furthermore, the controller 31 sequentially selects the portions with a marking MK of the image of the original document M, recognizes the character strings C20 and C21 in the portions with a marking MK, subjects the character strings C20 and C21 in the portions with a marking MK to the processing of exclusion, and keeps from adding the character strings C20 and C21 to edition information. Thus, the controller 31 generates edition information HD shown in FIG. 11. The controller 31 converts the edition information HD into a file in text format or CSV format and allows the USB memory, the storage device 28 or the external storage to store the file.

The image of an original document often contains a character string (such as a text). If, in this case, an image processing apparatus could extract the character string from the image of the original document and subject the character string to processing desired by the user, the convenience of the apparatus would improve.

The general document reading device previously described extracts a region of a photograph in an original document specified by a marking and stores image data on the photograph into an electronic file. However, this technique is not a technique for subjecting the region of the photograph to processing desired by the user.

The general data storage device previously described allows a mobile phone to send a file and a storage destination for the file to a server and allows the server to store the file into the storage destination. However, this technique is not a technique for subjecting the file to processing desired by the user.

Unlike the above general techniques, in this embodiment, the controller 31 identifies, based on image data representing the image of an original document M, any index, such as a marking MK, an underline UL or a box BX, contained in the image of the original document M, extracts from the image of the original document M a portion or portions thereof specified by each index, recognizes respective character strings C in the extracted portions, and subjects the recognized character strings C to user-desired processing, such as collection or exclusion, associated with the index to generate edition information. As a result, the image of the original document M can be easily edited, which improves the convenience.

Although in the above embodiment the controller 31 sets the processing of exclusion of any character string C with a marking MK and the processing of collection of any character string C enclosed in a box BX, the present disclosure is not limited to the above embodiment. For example, the controller 31 may set an appropriate combination selected from the group consisting of the processing of collection or exclusion of any character string C with a marking MK, the processing of collection or exclusion of any character string C enclosed in a box BX, and the processing of collection or exclusion of any character string C with an underline UL. In this case, the controller 31 previously registers the marking MK, the box BX, and the underline UL into the data table DT, previously registers into the data table DT the processing of collection or exclusion in association with each of the marking MK, the box BX, and the underline UL, and also previously registers into the data table DT a file format and a storage destination for the file each in association with at least one of the marking MK, the box BX, and the underline UL. Based on the association of each of the marking MK, the box BX, and the underline UL with the processing of collection or exclusion registered in the data table DT, the controller 31 subjects each of the character strings C specified by the marking MK, the box BX or the underline UL to the processing of collection or exclusion. At each time of the processing, the controller 31 generates or updates edition information, converts the edition information into a file in the file format registered in the data table DT, and allows the storage destination registered in the data table DT to store the file.

The present disclosure is not limited to the image forming apparatus according to the above embodiment. The present disclosure can be applied to a copier with an image reading device, a facsimile machine with an image reading device, or a system in which a PC, a scanner, and so on are combined with a copier or a facsimile machine.

The structures, configurations, and processing described in the above embodiment with reference to FIGS. 1 to 11 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
an image input device to which an image of an original document is input;
a control device including a processor and functioning, through the processor executing a control program, as a controller that identifies a preset index contained in the image of the original document input to the image input device, extracts from the image of the original document a portion of the image specified by the index, recognizes a character string in the extracted portion, and subjects the recognized character string to processing associated with the index to generate edition information; and
an operation device to which a user's instruction is input, wherein, in accordance with the instruction input to the operation device, the controller sets processing of collection or exclusion as the processing associated with the index and collects or excludes the recognized character string to generate the edition information.

2. The image processing apparatus according to claim 1, wherein, in accordance with the instruction input to the operation device, the controller sets a storage destination for the edition information and allows the storage destination to store the generated edition information.

3. An image processing apparatus comprising:
an image input device to which an image of an original document is input; and
a control device including a processor and functioning, through the processor executing a control program, as a controller that identifies a preset index contained in the image of the original document input to the image input device, extracts from the image of the original document a portion of the image specified by the index, recognizes a character string in the extracted portion, and subjects the recognized character string to processing associated with the index to generate edition information,
wherein when identifying a plurality of types of the indices contained in the image of the original document, the controller performs, for each of the plurality of types of the indices, extraction of the portion of the image specified by the index and recognition of the character string in the extracted portion and subjects each of a plurality of the recognized character strings to the processing associated with the index for the character string to generate the edition information.

4. The image processing apparatus according to claim 3, wherein the controller sets, based on respective locations of the portions specified by the indices in the image of the original document, an order of selection of the portions specified by the indices, and arranges in the set order the character strings subjected to the processing, thus generating the edition information.

5. An image processing apparatus comprising:
an image input device to which an image of an original document is input; and
a control device including a processor and functioning, through the processor executing a control program, as a controller that identifies a preset index contained in the image of the original document input to the image input device, extracts from the image of the original document a portion of the image specified by the index, recognizes a character string in the extracted portion, and subjects the recognized character string to processing associated with the index to generate edition information,
wherein when extracting a first portion specified by the index from the image of the original document, the controller determines whether or not the first portion further contains a second portion specified by the index, and
when the first portion contains the second portion, the controller recognizes the character string in the second portion instead of the first portion.

* * * * *